United States Patent [19]

Herbenar et al.

[11] 4,101,227

[45] Jul. 18, 1978

[54] PIVOT JOINT

[75] Inventors: Edward J. Herbenar, Birmingham; Albert W. Gair, Fraser, both of Mich.

[73] Assignee: TRW Inc., Cleveland, Ohio

[21] Appl. No.: 757,342

[22] Filed: Jan. 6, 1977

[51] Int. Cl.² .......................... B25G 3/00; F16C 11/00
[52] U.S. Cl. ..................... 403/27; 403/147; 403/165; 403/138; 280/95 A
[58] Field of Search ............... 403/146, 147, 136, 138, 403/27, 164, 165; 308/71; 280/96.1, 95 A, 673

[56] References Cited

U.S. PATENT DOCUMENTS

| | | | |
|---|---|---|---|
| 1,374,267 | 4/1921 | Whitehead | 308/171 |
| 2,241,506 | 5/1941 | Eppler, Jr. | 403/146 |
| 2,426,358 | 8/1947 | Klages et al. | 403/136 |
| 2,913,251 | 11/1959 | Herbenar | 308/71 X |
| 2,944,829 | 7/1960 | Herbenar | 280/95 A |
| 3,044,798 | 7/1962 | Gerner | 403/147 X |
| 3,369,848 | 2/1968 | Gerner | 403/147 X |
| 3,849,010 | 11/1974 | Herbenar | 403/138 |
| 3,945,737 | 3/1976 | Herbenar | 403/27 |

*Primary Examiner*—Andrew V. Kundrat

[57] ABSTRACT

An improved wear-indicating pivot joint includes a bearing assembly which supports a stud for both axial and rotational movement. The bearing assembly prevents sidewise tilting movement of the stud during axial and rotational movement of the stud about its own central axis. A wear take-up arrangement is provided to compensate for normal wear between a bearing surface and the stud. The wear take-up arrangement includes a spring which applies a force to a bearing member to continuously urge the bearing surface into engagement with the stud to hold the stud against sidewise tilting movement. However, upon the occurrence of excessive wear between the bearing surface and the stud, the bearing surface is ineffective to hold the stud against sidewise tilting movement to thereby signal the occurrence of excessive wear.

12 Claims, 6 Drawing Figures

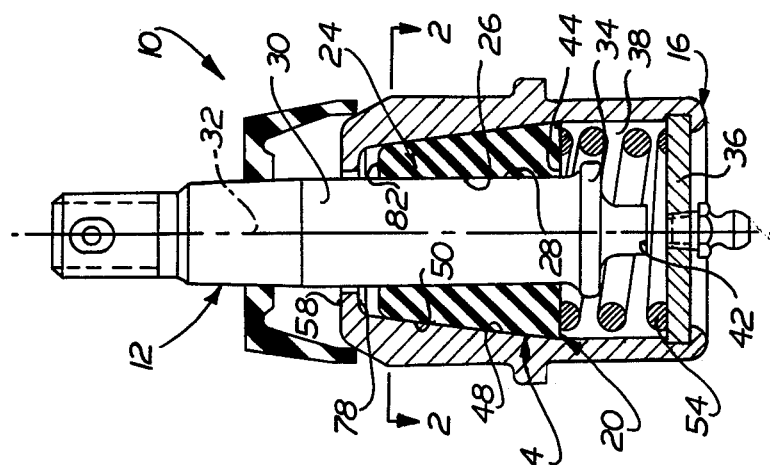
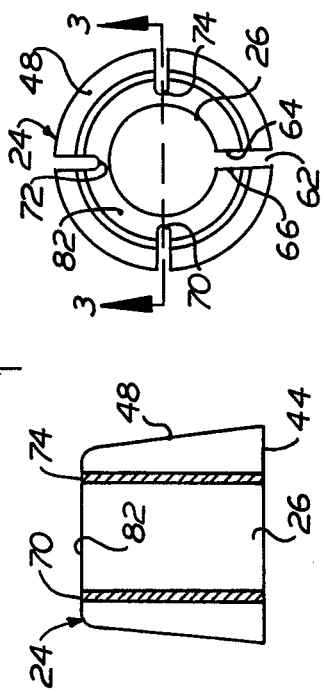
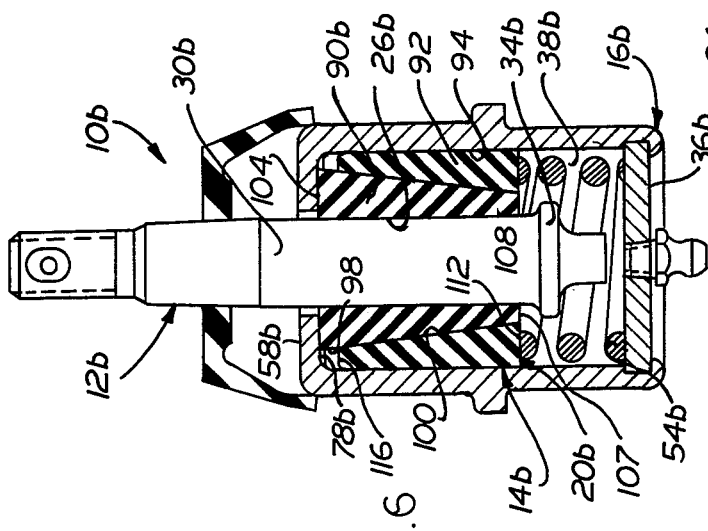
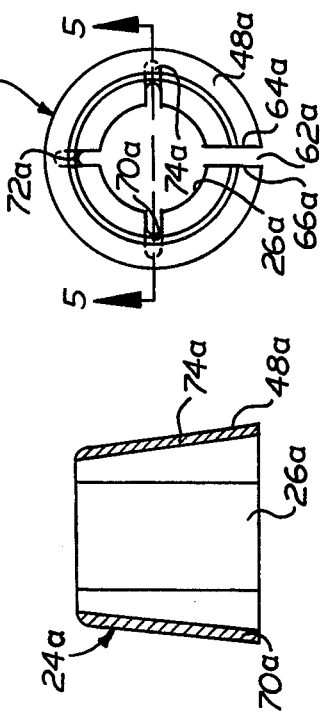

PIVOT JOINT

BACKGROUND OF THE INVENTION

The present invention relates to a new and improved pivot joint assembly and more specifically to a new and improved wearindicting pivot joint having a bearing which prevents sidewise movement of a stud while supporting the stud for free rotational and axial movement relative to a housing.

It is frequently desirable to provide a pivot joint having a bearing which will enable a stud to both rotate and/or move axially while retaining the stud against tilting and/or lateral movement even after normal wear has occurred. Joints of this type are useful in applications where tilting and/or lateral motion of the stud is not required or is undesirable. In addition, this type of joint is advantageously used in linkages where due to manufacturing tolerances and other reasons, the distance between two members varies along an axis about which the members pivot relative to each other. Specifically, such a pivot joint is particularly advantageous when used as the non-load carrying pivot joint in the front wheel assembly of a four-wheel drive vehicle.

A pivot joint having an axially movable and rotatable stud in association with the idler arm of an automobile steering linkage is disclosed in U.S. Pat. No. 2,944,829. In the pivot joint disclosed in this patent, a spring acts directly on the stud to retard axial movement of the stud. A head and portion of the stud is pressed against a tapered bearing by the spring. As long as the spring is effective to press the head end portion of the stud against the bearing, the bearing will tend to retard tilting movement of the stud. However, upon the occurrence of axial movement of the stud against the influence of the spring, the bearing is free to become unseated in such a manner as to tend to enable the stud to be moved sidewise or tilted.

Another pivot joint assembly of a somewhat different type is disclosed in U.S. Pat. No. 3,945,737. The stud of the pivot joint disclosed in this patent is held against axial movement by a bearing ring and a bearing cavity end cap or closure disc. Although the stud is urged toward an initial position by a bearing member, the bearing member is composed of a resilient material which enables the stud to be readily tilted upon the application of sidewise forces to the stud. Still other pivot joint assemblies are disclosed in U.S. Pat. Nos. 1,374,267; 1,554,520; 2,241,506; 3,044,798; 3,352,583; 3,361,459; 3,369,848 and 3,434,763.

SUMMARY OF THE PRESENT INVENTION

The present invention provides a pivot joint assembly in which a stud is freely rotatable and axially movable. The stud is held against sidewise or tilting movement by a bearing assembly. A wear take-up arrangement is effective to compensate for normal wear between the stud and a bearing surface. Upon the occurrence of excessive wear between the stud and bearing surface, the bearing assembly allows the stud to tilt sideways to thereby indicate excessive wear of one or more components of the pivot joint assembly.

The bearing assembly includes a split axially tapered bearing member having an inner bearing surface which is pressed against the shank of the stud by a spring to hold the stud against sidewise movement. As normal wear occurs between the components of the pivot joint assembly, the spring causes a pair of axially tapered wear take-up surfaces to press the inner surface of the bearing member firmly against the shank of the stud to hold the stud against sidewise tilting movement. Although the stud is held against sidewise tilting movement, it is freely movable along and rotatable about its own central axis. To this end, the spring is effective to apply a biasing force to the bearing assembly independently of the stud and is ineffective to hold the stud against axial and rotational movement. In addition, the spring is effective to prevent unseating of the bearing assembly upon axial movement of the stud so that the bearing assembly continuously holds the stud against tilting movement.

In one specific preferred embodiment of the invention, the bearing assembly includes a single bearing member having a cylindrical inner surface which engages the cylindrical shank of the stud and an axially tapered outer surface which cooperates with a correspondingly tapered inner surface of a housing enclosing the bearing assembly. The spring applies an axially directed force against the bearing member to continuously press the tapered outer surface of the bearing member into wedging engagement with the similarly tapered inner surface of the housing. The wedging action between the two tapered surfaces causes the bearing member to be radially compressed into tight engagement with the shank of the stud.

In another specific preferred embodiment of the invention a pair of bearing members are utilized. A first or inner one of the bearing members has a cylindrical inner surface which engages the cylindrical shank of the stud to hold the stud against sidewise movement. This first or inner bearing member has an axially tapered outer surface. A second or outer bearing member having an axially tapered inner surface is disposed in abutting wedging engagement with the axially tapered outer surface of the inner bearing member. A spring is utilized to apply force directly against the outer bearing member to continuously urge the outer bearing member into tight wedging engagement with the inner bearing member to press the inner bearing member into tight engagement with the shank of the stud even after normal wear has occurred between the stud and the inner bearing member.

Accordingly, it is an object of this invention to provide a new and improved wear-indicating pivot joint assembly having a bearing assembly for supporting a stud for free rotational and axial movement relative to a housing while inhibiting tilting movement of the stud relative to the housing and wherein the stud can tilt relative to the housing upon the occurrence of more than normal wear between the bearing assembly and the stud.

Another object of this invention is to provide a new and improved pivot joint assembly in which an axially movable and rotatable stud is held against sidewise movement by a bearing assembly and wherein a wear take-up means is provided to press a bearing surface firmly against the shank portion of the stud during axial and rotational movement of the stud even after some wear has occurred between the bearing surface and a shank of the stud.

BRIEF DESCRIPTION OF THE DRAWINGS

The foregoing and other objects and features of the present invention will become more apparent upon a consideration of the following description taken in connection with the accompanying drawings wherein:

FIG. 1 is a sectional view of a pivot joint assembly constructed in accordance with the present invention;

FIG. 2 is a plan view, taken generally along the line 2—2 of FIG. 1, of a bearing member utilized in the bearing assembly of FIG. 1;

FIG. 3 is a sectional view, taken generally along the line 3—3 of FIG. 2, further illustrating the construction of the bearing member;

FIG. 4 is a plan view, generally similar to FIG. 2, of a second embodiment of a bearing member which can be utilized in the pivot joint assembly of FIG. 1;

FIG. 5 is a sectional view, taken generally along the line 5—5 of FIG. 4, further illustrating the construction of the second embodiment of the bearing member; and FIG. 6 is a sectional view, generally similar to FIG. 1, of a second embodiment of the pivot joint assembly.

DESCRIPTION OF SPECIFIC PREFERRED EMBODIMENTS OF THE INVENTION

A pivot joint assembly 10 constructed in accordance with the present invention is illustrated in FIG. 1. The pivot joint assembly 10 includes a stud member 12 which is supported by a bearing assembly 14 for axial and rotational movement relative to a housing 16. A wear take-up arrangement 20 cooperates with the bearing assembly 14 to maintain the bearing assembly in firm engagement with the stud 12 to hold the stud against sidewise or tilting movement even after normal wear has occurred between the bearing assembly and the stud. Upon the occurrence of excessive wear between the bearing assembly 14 and the stud 12, the wear take-up arrangement 20 is ineffective to maintain the bearing assembly in firm engagement with the stud and the stud is free to tilt sidewardly to indicate that excessive wear has occurred.

In the embodiment of the invention illustrated in FIG. 1, the bearing assembly 14 includes a single bearing member 24 having a cylindrical inner bearing surface 26 which abuttingly engages and is coaxial with a cylindrical outer surface 28 of a shank portion 30 of the stud 12. The bearing member 24 cooperates with the housing 16 to hold the stud against sidewise tilting movement. However, the bearing member 24 is ineffective to hold the stud 12 against axial movement along and rotational movement about a central axis 32 of the stud.

To enable the stud 12 to move axially along its central axis 32, a circular head end portion 34 of the stud is spaced apart from a circular closure cap or disc 36 which closes one end portion of a bearing cavity 38 in the housing 16. A circular stop surface 42 on the head end 34 of the stud 12 engages the end cap 36 to limit axially downward (as viewed in FIG. 1) movement of the stud. Similarly, the circular head end portion 34 of the stud engages an annular outer end face 44 of the bearing member 24 to limit axially upward (as viewed in FIG. 1) movement of the stud along the axis 32. The bearing member 24 is ineffective to retain the stud 12 against rotational movement about its own central axis 32 and is ineffective to retain the stud against axial movement along its own central axis.

It is contemplated that after the pivot joint 10 has been utilized for a period of time, normal wear will occur between the cylindrical inner surface 26 of the bearing member 24 and the cylindrical outer surface 28 of the stud 12. In the absence of the wear take-up arrangement 20, this normal wear would result in the stud being loosely engaged by the bearing member 24 so that the bearing member would be free to tilt or move sidewise relative to the housing 16. To prevent this from occurring, the wear take-up arrangement 20 is effective to radially deflect the bearing member 24 inwardly to press the cylindrical surface 26 on the bearing member against the cylindrical outer surface 28 of the stud shank 30 even after normal wear has occurred between the stud and the bearing member.

The wear take-up arrangement 20 includes an axially tapered frusto-conical outer surface 48 formed on the bearing member 24 (see FIGS. 2 and 3) and a similarly tapered frusto-conical surface 50 (FIG. 1) formed on the inside of the housing 16. The wear take-up arrangement 20 also includes a coil spring 54 disposed in the bearing cavity 38 between the end cap 36 and the bearing member 24. The coil spring 54 is effective to urge the bearing member 24 axially outwardly toward an open end portion 58 of the housing 16. This results in a wedging action between the tapered outer surface 48 and the bearing member 24 and the similarly tapered inner surface 50 on the housing. It should be noted that the central axis 32 of the stud 12 is coincident with the central axes of the tapered surfaces 48 and 50, the bearing surface 26 and the spring 54.

In order to enable the wedging action applied to the bearing member 24 to press the cylindrical bearing surface 26 into firm engagement with the stud shank 30, the bearing member 24 is split so that an axially extending wear take-up gap 62 (see FIG. 2) is formed between a pair of flat transverse surfaces 64 and 66 which are disposed on opposite sides of the gap 62 and extend between the cylindrical bearing surface 26 and the frusto-conical outer surface 48 of the bearing member 24. In addition, a plurality of relatively thin hinge sections 70, 72 and 74 are formed in the bearing member 24. The hinge sections 70, 72 and 74 enable the bearing member 24 to be resiliently compressed inwardly as the cylindrical bearing surface 26 is pressed radially inwardly into tight abutting engagement with the cylindrical outer surface of a stud shank 30. The bearing member 24 is compressed inwardly under the influence of radially inwardly directed forces applied to the tapered outer surface 48 of the bearing member 24 by a wedging action between the outer surface of the bearing member and the tapered inner surface 50 of the housing 16.

As wear occurs between the bearing member 24 and the relatively hard shank of the stud 12, the size of the cylindrical opening defined by the inner surface 26 of the bearing member 24 tends to increase. However, as the bearing surface 26 is worn by the stud shank 30, the axially directed force against the tapered bearing member 24 causes a wedging action between the axially tapered wear take-up surfaces 48 and 50 to maintain the bearing surface 26 in engagement with the stud shank 30. It should be noted that the force utilized to press the bearing surface 26 into firm engagement with the stud shank 30 can be varied by varying the angle at which the surfaces 48 and 50 taper relative to the central axis 32 of the stud and by varying the strength of the spring 54.

After excessive or abnormal wear has occurred between the bearing member 24 and the stud 12, the wear take-up arrangement 20 is no longer effective to compensate for wear and the stud 12 is released for sidewise or tilting movement relative to the housing 16. This sidewise or tilting movement of the stud 12 relative to the housing 16 provides a clear signal that excessive wear has occurred between the bearing member 24 and the stud 12 and that repair or replacement of the pivot joint assembly 10 is necessary. However, it should be noted that until excessive wear occurs between the stud 12 and the bearing 24, the bearing member is effective to hold the stud against sidewise or tilting movement while allowing the stud to rotate and move along its central axis 32 under the influence of operating forces applied to the stud.

To provide for the releasing of the stud for sidewise tilting movement upon the occurrence of excessive wear between the bearing member 24 and the stud 12, an annular stop surface 78 is provided at the open outer end portion 58 of the bearing cavity 38. As wear occurs between the cylindrical bearing surface 26 and the stud shank 30, the axial pressure of the spring 54 against the relatively large diameter annular end face 44 of the bearing member 24 urges the bearing member 24 axially upwardly (as viewed in FIG. 1) toward the open end portion 58 of the housing 16 and the stop surface 78. When a predetermined amount of normal wear has occurred between the bearing member 24 and stud 12, a relatively small diameter annular outer end face 82 of the bearing member 24 moves into abutting engagement with the stop surface 78. This renders the spring 54 ineffective to cause a wedging action between the two axially tapered surfaces 48 and 50. Therefore, any further wear between the cylindrical stud shank 30 and the bearing surface 26 results in the stud 12 being released for sidewise movement relative to the housing 16.

It should be noted that the gap 62 (FIG. 2) between the transverse surfaces 64 and 66 of the split bearing member 24 is large enough so that the relatively small or minor end surface 82 on the bearing member 24 will move into engagement with the stop surface 78 before the transverse surfaces 64 and 66 move into abutting engagement with each other. However, under certain circumstances it may be desirable to size the gap 62 so that the transverse surfaces 64 and 66 act as stop surfaces. In this construction, the gap 62 closes to stop axial movement of the bearing member 24 prior to engagement of the relatively small or minor end portion 82 of the bearing member with the open end portion 58 of the housing 16.

In the embodiment of the invention illustrated in FIGS. 2 and 3, the bearing member 24 is provided with resiliently deflectable hinge connections 70, 72 and 74 between arcuate segments of the bearing member 24. These hinge connections 70, 72 and 74 are disposed adjacent to the cylindrical bearing surface 26. In the embodiment of the bearing member illustrated in FIGS. 4 and 5, the relatively thin hinge connections are formed between arcuate segments of the bearing member at a location adjacent to the tapered outer surface of the bearing member. Since the embodiment of the bearing member illustrated in FIGS. 4 and 5 is generally similar to the embodiment of the bearing member illustrated in FIGS. 2 and 3, similar numerals will be utilized to identify similar components, the suffix letter "a" being utilized in association with the numerals of FIGS. 4 and 5 in order to avoid confusion.

The bearing member 24a is provided with an axially tapered frusto-conical outer side surface 48a and a cylindrical inner bearing surface 26a. A gap 62a is provided between transverse surfaces 64a and 66a of the bearing member 24a. In accordance with a feature of the embodiment of FIGS. 4 and 5, the bearing member 24a is provided with deflectable hinge connections 70a, 72a and 74a between arcuate segments of the bearing member 24a. The hinge connections 70a, 72a and 74a enable the bearing member 24a to be deflected inwardly under the influence of a wedging action between the tapered outer surface 48a of the bearing member and a similarly tapered inner surface of an associated housing in the manner previously explained in connection with the embodiment of the invention illustrated in FIGS. 1–3. However, it should be noted that the hinge connections 70a, 72a and 74a are located adjacent to the frusto-conical outer surface 48a of the bearing member 24a rather than being located adjacent to the cylindrical inner or bearing surface 26a in the manner illustrated in FIGS. 2 and 3.

In the embodiment of the pivot joint assembly 10 illustrated in FIG. 1, a single bearing member 24 is utilized to hold the stud 12 against sidewise or tilting movement while enabling the stud to be freely rotated and moved axially. In the embodiment of the pivot joint assembly illustrated in FIG. 6, a pair of bearing members are utilized to hold the stud against tilting movement while enabling the stud to be freely rotated and moved axially. In the embodiment of the invention illustrated in FIG. 6, the axially tapered wear take-up surfaces are provided on the two bearing members rather than being provided on the housing and a single bearing member in the manner described in connection with FIG. 1. Since the embodiment of the pivot joint assembly illustrated in FIG. 6 is generally similar to the embodiment of the pivot joint assembly illustrated in FIG. 1, similar numerals will be utilized to identify similar components, the suffix letter "b" being associated with the numerals utilized to identify the components of the embodiment of the invention illustrated in FIG. 6.

In the embodiment of the invention illustrated in FIG. 6, a pivot joint 10b includes an axially movable and rotatable stud 12b which is held against sidewise tilting movement by a bearing assembly 14b disposed within a housing 16b. In accordance with a feature of the embodiment of the invention illustrated in FIG. 6, the bearing assembly 14b includes a first or inner bearing member 90 having a cylindrical inner surface 26b disposed in engagement with a cylindrical shank 30b of the stud 12b. A second bearing member 92 is provided between the inner bearing member 90 and a cylindrical inner surface 94 of the housing 16b. The two bearing members 90 and 92 cooperate with the housing 16b to hold the stud shank 30b against sidewise or tilting movement relative to the housing 16b.

A wear take-up arrangement 20b is provided to compensate for a normal wear between the cylindrical bearing surface 26b and the cylindrical shank 30b of the stud 12b. The wear take-up arrangement 20b includes an axially tapered frusto-conical surface 98 formed on the outside of the bearing member 90 and a similarly axially tapered frusto-conical surface 100 formed on the inside of the bearing member 92. A relatively large diameter annular outer end face surface 104 of the inner bearing member 90 is disposed in abutting engagement with an annular stop surface 78b formed on the open end portion 58b of the housing 16b. A relatively small diameter annular end face 107 of the bearing member 90 is disposed adjacent to the circular head end 34b of the stud 12b and the housing end cap 36b.

To provide a continuous wedging action between the two bearing members 90 and 92, a coil spring 54b engages a relatively large diameter annular outer end face 112 of the bearing member 92 and urges the bearing member upwardly (as viewed in FIG. 6) toward the annular stop surface 78b on the open end portion 58b of the housing 16b. As wear occurs between the bearing member 90 and stud shank 30b, the spring 54b is effective to slide the outer bearing member 92b along the cylindrical inner surface 94 of the housing 16b. This results in a wedging action which presses the cylindrical bearing surface 26b into firm engagement with the cylindrical shank 30b of the stud 12b.

The engagement of the bearing surface 26b with stud shank 30b holds the stud 12b against sidewise or tilting movement. However, the two bearing members 90 and 92 are ineffective to hold the stud member 12b against rotational movement about and axial movement along its central axis. Therefore, the stud 12b is free to move axially and rotate while being held against sidewise or tilting movement by the bearing assembly 14b.

When a predetermined amount of wear has occurred between the cylindrical bearing surface 26b and stud shank 30b, a relatively small annular end face 116 of the outer bearing member 92 is moved into abutting engagement with the annular stop surface 78b under the influence of the spring 54b. Of course, once the bearing member 92 has engaged the stop surface 78, the bearing member 92 is no longer movable axially to press the bearing surface 26b firmly against the stud shank 20b as wear continues to occur. This results in the stud 12b being released for sidewise or tilting movement relative to the housing 16b.

The sidewise or tilting movement of the stud 12b upon the occurrence of excessive wear between the bearing assembly 14b and the stud 12b provides a clear indication that the pivot joint assembly 10b is in need of replacement or repair. It should be noted that prior to the occurrence of excessive wear between the bearing members 90 and 92, the end face 16b of the bearing member 92 was spaced apart from the stop surface 78b and the axially upward (as viewed in FIG. 6) pressure exerted against the bearing member 92 by the spring 54b caused the bearing member 92 to wedgingly press the bearing surface 26b on the inner bearing member 90 into firm engagement with the stud shank 30b. The bearing member 90b is provided with a longitudinally extending gap similar to the gap 62 of FIG. 2 and the gap 62a of FIG. 4. In addition, the bearing member 90 is provided with hinge connections similar to the hinge connections 70, 72 and 74 of FIG. 2 or the hinge connections 70a, 72a and 74a of FIG. 4 to enable the bearing member 90 to be readily deflected inwardly under the influence of forces applied to the bearing member 90 by the outer bearing member 92.

In the pivot joint assemblies 10 and 10b, the springs 54 and 54b are effective to apply the force directly to the bearing assemblies 14 and 14b. Of course, this direct force could be applied through a suitable spring seat between the bearing assembly and the spring member. In any event, the springs 54 and 54b are ineffective to retard axial movement of the studs 12 and 12b so that they can be freely moved axially relative to the housing 16b. However, the bearing assemblies 14 and 14b are effective to hold the studs 12 and 12b against sidewise or tilting movement relative to the housing until excessive wear has occurred between the parts of the pivot joint assemblies 10 and 10b.

In order to enable the bearing assemblies 14 and 14b to hold the studs 12 and 12b against sidewise movement, the bearing assemblies are relatively rigid and do not easily yield under the influence of sidewise forces.

Thus, the bearing member 24 of FIG. 1 and the bearing members 90 and 92 of FIG. 6 are made of a relatively rigid material having a hardness of 80 duramater to 120 Rockwell M scale. Although many different types of relatively rigid materials could be utilized to form the bearing members, in specific preferred embodiments of the invention the bearing members were formed of either Nylon, Delron or polyethylene plastic materials. It should be noted that hinge connections similar to the hinge connections 70, 72 and 74 and 70a, 72a and 74a are utilized in association with the relatively rigid materials to enable the bearing members 24 and 90 to be deflected to maintain the bearing surfaces 26 and 26a in abutting engagement with the studs 12 and 12b upon the occurrence of wear between the studs and the bearing assemblies 14 and 14b.

The pivot joints 10 and 10b can be utilized in many different environments wherein it is desired to have an axially movable and rotatable stud member which is held against sidewise tilting movement. It is contemplated that a pivot joint constructed in accordance with the present invention could advantageously be utilized as a non-load carrying pivot joint in the front wheel assembly of a four-wheel drive vehicle.

In view of the foregoing description it is apparent that the studs 12 and 12b are freely rotatable and axially movable relative to the pivot joint housing 16 and 16b. The studs 12 and 12b are held against sidewise or tilting movement by bearing assemblies 14 and 14b. Wear take-up arrangements 20 and 20b are effective to compensate for normal wear between the studs 12 and 12b and bearing surfaces 26 and 26b. Upon the occurrence of excessive wear between the studs and bearing surfaces, the bearing assemblies 14 and 14b allow the stud to tilt sideways to thereby indicate excessive wear of one or more components of the pivot joint assemblies 10 and 10b.

The bearing assemblies 14 and 14b include split axially tapered bearing members 24 and 24b having inner bearing surfaces 26 and 26b which are pressed against the shanks of the stud 12 and 12b by springs 54 and 54b to hold the studs against sidewise movement. As normal wear occurs between the components of the pivot joint assemblies 10 and 10b, springs 54 and 54b cause axially tapered wear take-up surfaces 48, 50, 98 and 100 to press the inner surfaces 26 and 26b of the bearing members firmly against the shanks of the studs 12 and 12b to hold the studs against sidewise tilting movement, they are freely movable along and rotatable about their own central axes. To this end, the springs 54 and 54b are effective to apply a biasing force to the bearing assemblies 14 and 14b independently of the studs and are ineffective to hold the studs against axial and rotational movement. In addition, the springs 54 and 54b are effective to prevent unseating of the bearing assemblies upon axial movement of the studs 12 and 12b so that the bearing assemblies continuously hold the studs against tilting movement.

Having described specific preferred embodiments of the invention, the following is claimed:

1. A pivot joint assembly comprising housing means for at least partially defining a cavity, said housing means having open and closed end portions, an axially movable and rotatable stud extending axially through said open end portion of said housing means into said cavity, said stud having a head end portion disposed in said cavity and a cylindrical shank portion extending outwardly from said head end portion of said stud through said open end portion of said housing means, said stud being movable between a retracted position in which said shank portion extends a relatively small distance outwardly from said housing means and an extended position in which said shank portion extends a relatively large distance outwardly from said housing means, bearing means disposed in said cavity for preventing sidewise movement of said stud relative to said housing means during axial and rotational movement of said stud relative to said housing means, said bearing means including a cylindical bearing surface engaging the cylindrical shank portion of said stud and a circular end surface facing toward said closed end portion of said housing, said head end portion of said stud being disposed axially between said end surface of said bearing means and said closed end portion of said housing means, said head end portion of said stud having a first side surface which is disposed in abutting engagement with said circular end surface of said bearing means when said stud is in the extended position to limit axially outward movement of the shank portion of said stud, said head end portion of said stud having a second side surface which is disposed in abutting engagement with said closed end portion of said housing means when said stud is in the retracted position to limit axially inward movement of the shank portion of said stud, said first side surface being spaced apart from said bearing means when said stud is in the retracted position and said second side surface being spaced apart from said closed end portion of said housing means when said stud is in the extended position by a distance through which said stud is freely movable axially between the retracted and extended positions, and wear take-up means for pressing said cylindrical bearing surface firmly against the cylindrical shank portion of said stud during axial and rotational movement of said stud to enable said bearing means to hold said stud against sidewise movement after normal wear has occurred between said bearing surface means and the shank portion of said stud, said wear take-up means including spring means disposed between said bearing means and said closed end portion of said cavity for applying force to said bearing means to continuously urge said bearing surface into engagement with the shank portion of said stud during axial and rotational movement of said stud relative to said housing means prior to the occurrence of excessive wear between said bearing surface and the shank portion of said stud.

2. A pivot joint assembly as set forth in claim 1 wherein said wear take-up means includes means for enabling said bearing surface means to loosely engage the shank portion of said stud to render said bearing surface means ineffective to hold said stud against sidewise movement relative to said housing means upon the occurrence of excessive wear between said stud end and said bearing surface means.

3. A pivot joint assembly as set forth in claim 1 wherein said wear take-up means includes a pair of tapered surfaces one of which is connected with said bearing surface means, said spring means being effective to apply force directly to said bearing means in a direction parallel to the central axis of said stud to cause said tapered surfaces to press said bearing surface means against the shank portion of said stud.

4. A pivot joint assembly as set forth in claim 1 wherein said bearing means includes a split bearing member having an annular cross sectional configuration, said bearing surface means including an inner surface of said bearing member, said wear take-up means including an axially tapered outer surface of said bearing member and a second axially tapered surface disposed in abutting engagement with said axially tapered outer surface of said bearing member, said split bearing member having a pair of transverse surfaces extending between said inner and outer surfaces of said bearing member and disposed on opposite sides of an axially extending wear take-up gap formed in said bearing member, said spring means being effective to urge said axially tapered surfaces against each other to radially compress said bearing member and decrease the size of the axially extending wear take-up gap formed in said bearing member to thereby maintain said bearing surface means in engagement with the shank portion of said stud upon the occurrence of normal wear between said bearing surface means and the shank portion of said stud.

5. A pivot joint assembly as set forth in claim 4 wherein said second axially tapered surface is an inner surface of said housing means.

6. A pivot joint assembly as set forth in claim 4 wherein said bearing means includes a second bearing member, said second axially tapered surface being an inner surface of said second bearing member, said second bearing member having an outer surface disposed in abutting engagement with said housing means.

7. A pivot joint assembly as set forth in claim 6 wherein said spring means is effective to apply force directly against said second bearing member and is ineffective to retard axial movement of said stud.

8. A pivot joint assembly as set forth in claim 1 wherein said spring means includes a coil spring which circumscribes the path of movement of the head end portion of said stud as it moves between the extended and retracted positions.

9. A pivot joint as set forth in claim 1 wherein said first side surface of said head end portion of said stud has an annular configuration with an outside diameter which is greater than the diameter of said cylindrical shank portion of said stud.

10. A pivot joint assembly as set forth in claim 1 wherein said spring means presses against said end surface of said bearing means and against said closed end portion of said housing means.

11. A pivot joint assembly as set forth in claim 1 wherein said bearing means includes a first bearing member which circumscribes the shank portion of said stud and has an annular cross sectional configuration, said cylindrical bearing surface being disposed on the inside of said first bearing member, said bearing means further including a second bearing member circumscribing said first bearing member and engaging said housing means at a location radially outwardly from said shank portion of said stud, said wear take-up means including an axially tapered outer surface of said first bearing member and an axially tapered inner surface of said bearing member, said axially tapered inner and outer surfaces of said bearing members being disposed in abutting engagement with each other at a location radially outwardly of the shank portion of said stud, said spring means being effective to cause axial movement between said first and second members to maintain said cylindrical bearing surface on said first bearing member in tight abutting engagement with the shank portion of said stud.

12. A pivot joint assembly as set forth in claim 11 wherein said circular end surface of said bearing means is disposed on said first bearing member.

* * * * *